(No Model.)
H. C. OTTEN & A. KATHMANN.
CULTIVATOR PLOW.
No. 528,792. Patented Nov. 6, 1894.
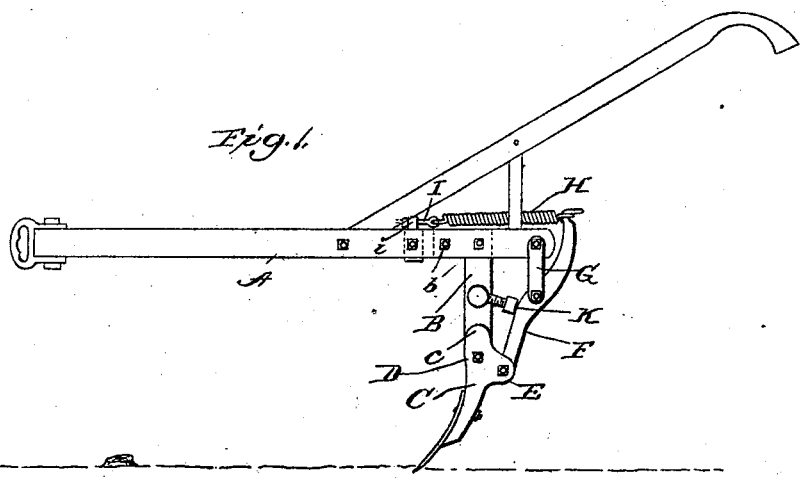
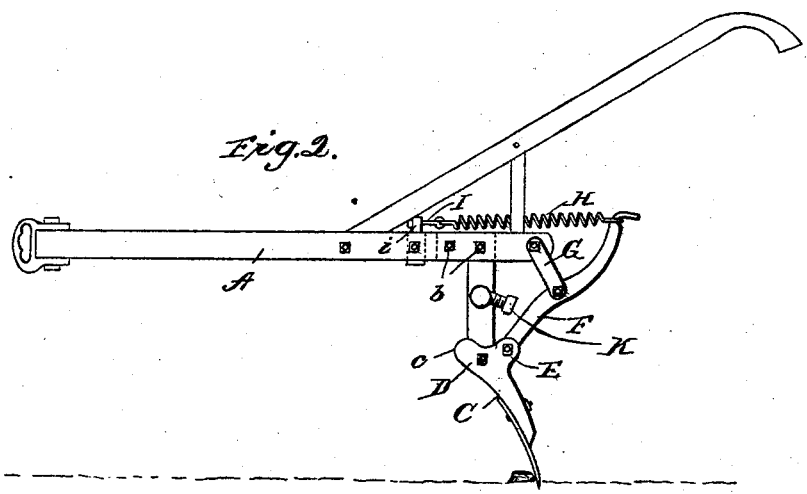
Witnesses:
J. M. Fowler Jr.
Aly J. Stewart.
Inventors.
Henry C. Otten and
Anton Kathmann,
By Church & Church
their Attorneys.

UNITED STATES PATENT OFFICE.

HENRY C. OTTEN AND ANTON KATHMANN, OF QUINCY, ILLINOIS.

CULTIVATOR-PLOW.

SPECIFICATION forming part of Letters Patent No. 528,792, dated November 6, 1894.

Application filed July 18, 1894. Serial No. 517,922. (No model.)

*To all whom it may concern:*

Be it known that we, HENRY C. OTTEN and ANTON KATHMANN, of Quincy, in the county of Adams and State of Illinois, have invented certain new and useful Improvements in Cultivator-Plows; and I do hereby declare the following to be a full, clear, and exact description of the same, reference being had to the accompanying drawings, forming a part of this specification, and to the letters of reference marked thereon.

This invention relates to improvements in devices for relieving the strain on a cultivator or cultivator plow frame when the shovel strikes an obstruction which might break or injure the implement, the objects of the invention being to provide a mechanism composed of few and simple parts compactly arranged to present no projecting parts and capable of a convenient adjustment.

The invention consists in certain novel details of construction and combinations and arrangements of parts, all as will be now described, and pointed out particularly in the appended claims.

Referring to the accompanying drawings: Figure 1 is a side elevation of a beam and shovel with our invention applied thereto, with the frame of the implement in outline. Fig. 2 is a similar view showing the position the parts assume when any unyielding obstruction is encountered by the shovel.

Like letters of reference indicate the same parts in both figures.

The beam lettered A in the drawings may be of any approved pattern. It is preferably however of iron, substantially straight and provided near or at the rear end with a downwardly projecting arm B, which, as shown, is bolted to one side of the beam by bolts b. To the end of this downward extension the shovel support or shovel itself is pivotally connected.

We have shown a shovel support consisting of a tubular body C having upwardly extending lugs c embracing the end of the downward extension of the beam and connected thereto by a bolt D, and also having at the upper end rearwardly projecting lugs or arms E. To the latter is pivotally connected the lower end of one member or lever F of a set of toggles, the other members being formed by links G, G, pivotally connected at one end to the lever F at an intermediate point and to the rear end of the beam at the opposite end. The member or lever F of the set of toggles is extended above the other member and beam, and is provided at the extreme end with a hook for the engagement of a long coil spring H extending along the top of the beam and substantially parallel therewith and connected to an adjustable eye bolt I held by a clip and nut i on the beam. The tendency of the spring is to draw the extended member of the toggle forward and by bringing the three pivotal centers of the toggle more nearly in line, force the arms E down and the shovel support forward. In accordance with well known mechanical principles the power exerted tending to hold the shovel support forward increases rapidly as the three centers of the toggle approach a straight line, the advantage of which is two-fold. First a comparatively light and cheap spring of the coil spring variety may be employed and ample resistance to the movement of the shovel secured, and, secondly, when said resistance is once overcome and the shovel started in its backward movement, the toggles fold and allow it to move with greater ease for riding over the obstruction without lifting the cultivator.

For the purpose of limiting the inward movement of the toggle, a set screw K is secured in the downward extension of the beam, or in a lug thereon, as shown, in position for the extended toggle lever to strike it just before the centers are in line. By setting this screw in or out the maximum power exerted by the toggle may be regulated accurately, and if desired the centers brought into alignment to hold the shovel rigidly as in the ordinary cultivator.

Having thus described our invention, what we claim as new is—

1. In an agricultural implement, such as described, the combination with the beam having a downward extension and the shovel support pivotally connected to lower end of the said extension, of the set of toggles, the lower member of which is pivotally connected to the rear portion of the shovel support and extends up above the beam and the upper member, the upper member connected to the beam and lower member, and the coil spring extending substantially parallel with the beam and connecting the extended end of the lower member of the toggle and beam, substantially as described.

2. In an agricultural implement, such as described, the combination with the beam having the downward extension and the shovel support pivotally connected thereto at the lower end and having the rearwardly projecting lug, of the toggle lever pivotally connected at one end to said lug, with its other end extended up to the beam, the upper toggle members or links, pivotally connected to the beam at one end and to the other toggle lever at an intermediate point of the latter, the set screw cooperating with the toggle to limit its inward movement, the coil spring connected to the top of the extended toggle member and the adjustable eye bolt connecting the forward end of the spring and beam; substantially as described.

HENRY C. OTTEN.
ANTON KATHMANN.

Witnesses:
L. E. EMMONS,
L. E. EMMONS, Jr.